Figures 1, 2, 3:
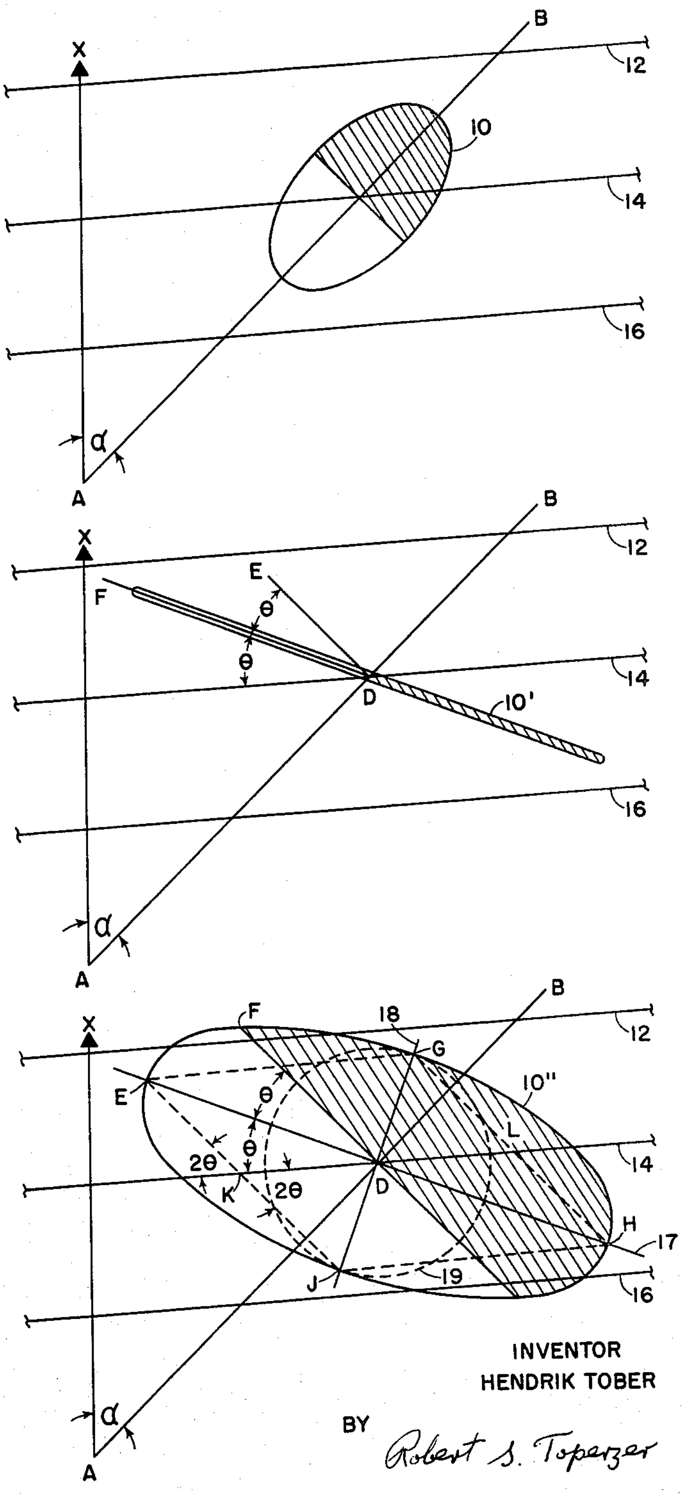

INVENTOR
HENDRIK TOBER

BY Robert S. Toperzer

July 5, 1966 H. TOBER 3,259,898
DOPPLER RADAR SYSTEM
Filed Feb. 17, 1964 4 Sheets-Sheet 1

(PRIOR ART)

INVENTOR

July 5, 1966 H. TOBER 3,259,898

DOPPLER RADAR SYSTEM

Filed Feb. 17, 1964 4 Sheets-Sheet 2

INVENTOR.
HENDRIK TOBER

BY

Philip J. McFarland
ATTORNEY

July 5, 1966 H. TOBER 3,259,898

DOPPLER RADAR SYSTEM

Filed Feb. 17, 1964 4 Sheets-Sheet 3

INVENTOR.
HENDRIK TOBER

BY

Philip J. McFarland
ATTORNEY

INVENTOR.
HENDRIK TOBER
BY
Philip McFarland
ATTORNEY

United States Patent Office 3,259,898

Patented July 5, 1966

3,259,898

DOPPLER RADAR SYSTEM

Hendrik Tober, Framingham, Mass., assignor to Laboratory for Electronics, Inc., Boston, Mass., a corporation of Delaware Filed Feb. 17, 1964, Ser. No. 345,226
4 Claims. (Cl. 343—8)

This invention pertains generally to radar systems and particularly to airborne Doppler radar velocity sensor systems.

It is known in the art that airborne Doppler radar systems, or "Doppler navigators," derive a spectrum of "Doppler shift" signals indicative of the instantaneous velocity of an aircraft with respect to the terrain over which the aircraft passes. Such signals are then processed in a computer to calculate continuously the present position of the aircraft with respect to a point of departure. It is obvious that the accuracy of the computations, i.e. the accuracy of the indicated present position of the aircraft, depends primarily on the accuracy with which the instantaneous velocity of the aircraft is determined. Unfortunately, however, the character of the terrain beneath the aircraft affects the "Doppler shift" signal returned at any given speed of the aircraft. That is, the Doppler shift in the elements of the returned signal are dependent on the reflective properties, or "terrain bias," of the terrain beneath the aircraft as well as on the velocity of the aircraft.

It is known that the effect of terrain bias may be minimized or compensated. For example, the reflective character of the terrain may be monitored continuously as described in the co-pending application of James L. Burrows, entitled Doppler Radar System, Serial No. 321,500, filed November 5, 1963 (which application is assigned to the same assignee as this application), to derive a correction signal which is directly related to changes in Doppler frequency due to changes in terrain bias. Another approach to the solution of the problem is to use a monopulse technique. That is, if overlapping beams are transmitted, then the Doppler navigator may be caused to operate in response to the center frequency of the return from the overlapping portions of the transmitted beams. Such center frequency is substantially independent of the reflective character of the terrain.

While both the just-mentioned approaches to the elimination of terrain bias error from the output of Doppler navigators are useful and practical, each requires added equipment and larger antenna systems than is desirable. It would be highly advantageous, therefore, if means could be arranged to accomplish compensation for terrain bias without adding to equipment or making it necessary to use a complicated antenna system.

Therefore, it is a primary object of this invention to provide an improved Doppler navigator system which is automatically compensated for terrain bias effects.

Another object of this invention is to provide an improved Doppler navigator system which does not require added equipment to compensate for terrain bias effects.

Still another object of this invention is to provide an improved Doppler navigator system which accomplishes the foregoing objects and uses a standard antenna configuration.

Figure 4:
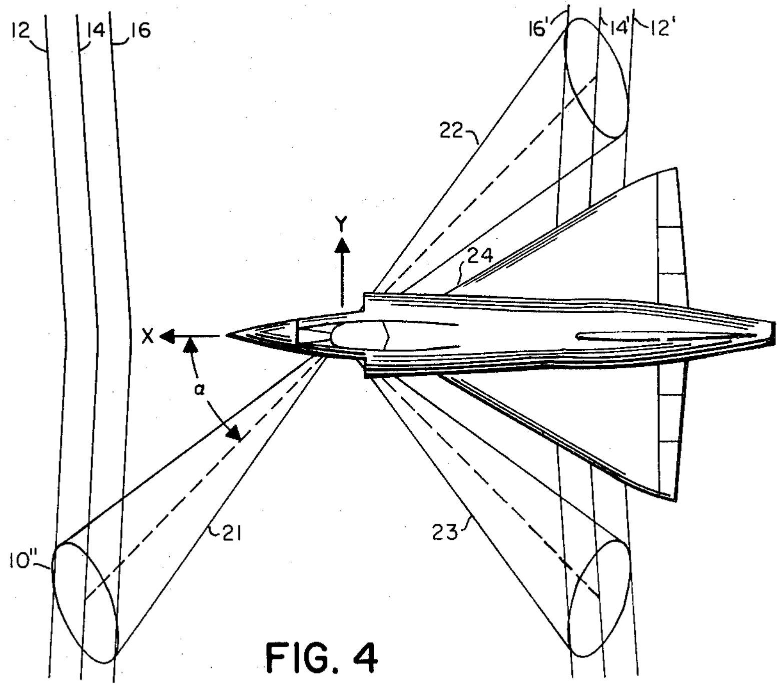
Figure 5:
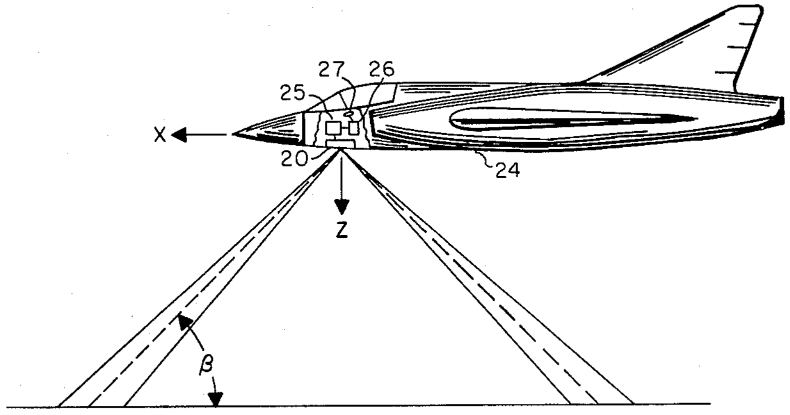
Figure 6:
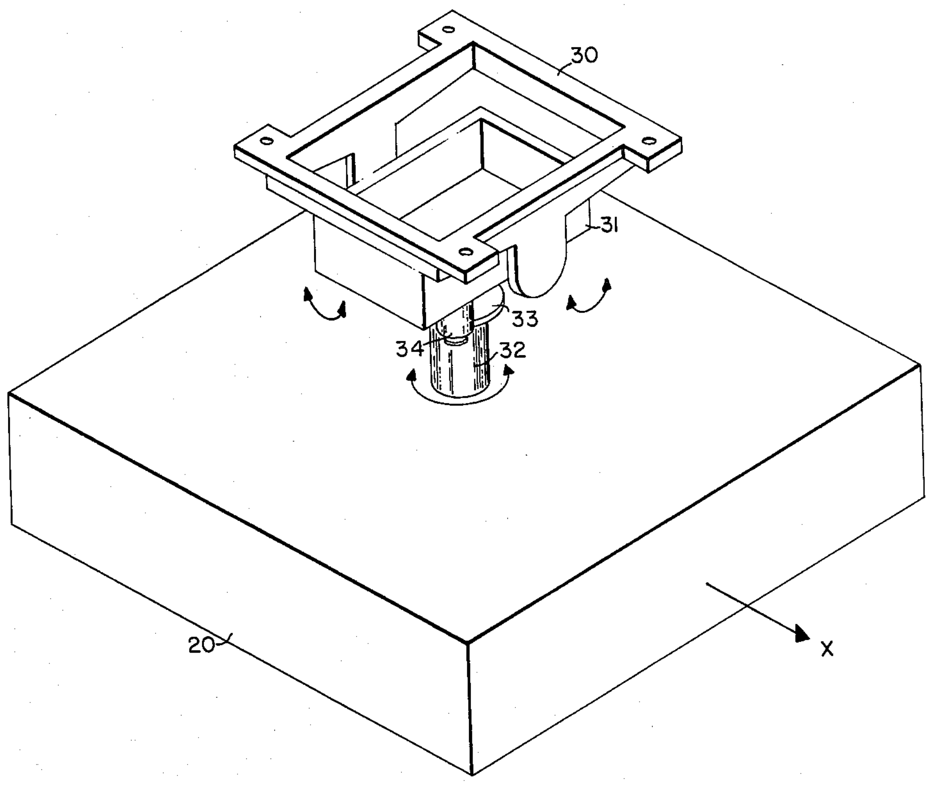
Figure 7:
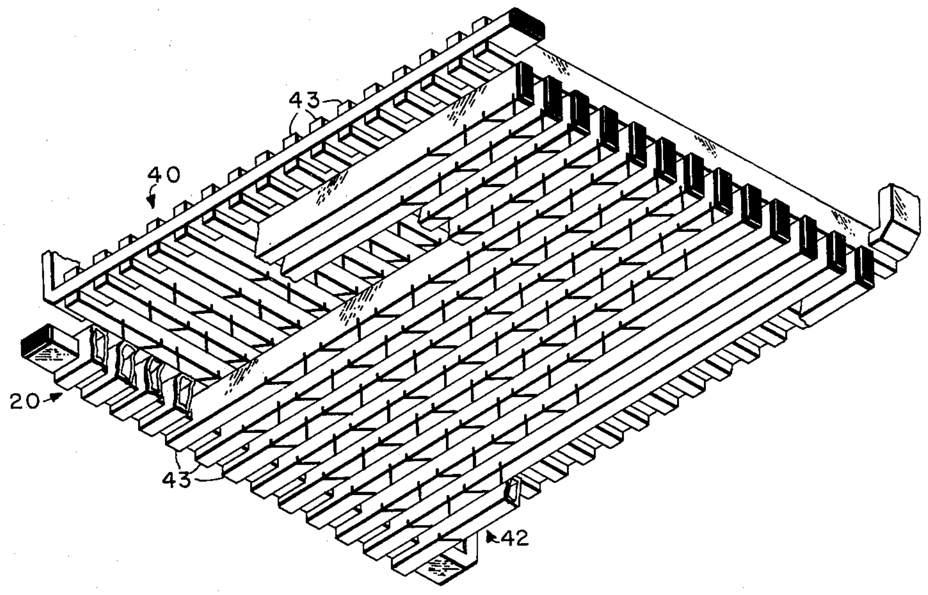

These and other objects of this invention are attained generally by shaping and directing beams from a Doppler navigator in such a manner that the intersection of each such beam with the terrain beneath the aircraft is an ellipse so shaped and oriented with respect to the line of flight of the aircraft that, regardless of the nature of the terrain, the centroid of the spectrum of frequencies in the Doppler signal returned to the aircraft remains substantially constant. For more complete understanding of the invention reference is now made to the following specifications and to the drawings, in which:

FIGS. 1, 2 and 3 are sketches illustrating, respectively, the manner in which terrain bias affects a prior art pencil beam; an extremely thin fan beam oriented so as to produce a shift in the Doppler frequency opposite to the shift caused by terrain bias on the beam shown in FIG. 1; and, an elliptical beam according to a preferred embodiment of the invention;

FIGS. 4 and 5 are, respectively, a plan and side view showing the manner in which beams according to the invention are oriented with respect to an aircraft; and, FIGS. 6 and 7 are, respectively, top and bottom views of an antenna adapted to form the beams shown in FIGS. 4 and 5.

Before considering the drawings in detail, it would be helpful to keep the following definitions in mind.

An "isodop" is a hyperbolic line on the terrain, symmetrical about the ground track of a moving aircraft, from any point of which signals at the same frequency are reflected back to such aircraft.

A "pencil beam" is a conical beam of electromagnetic energy at a single frequency, the distribution of power in such beam being symmetrical about the longitudinal axis thereof directed downwardly and away from the line of flight of an aircraft, the longitudinal axis of such beam making an acute angle with the local vertical through the aircraft. The intersection of such a beam on the terrain is an ellipse, encompassing several isodops, the major axis of such ellipse being colinear with the projection of the longitudinal axis of the beam on the terrain.

A "fan beam" is an elliptical beam of great eccentricity of electromagnetic energy at a single frequency, the distribution of power in such beam being symmetrical about the longitudinal axis thereof, directed downwardly and away from the line of flight of an aircraft, the longitudinal axis of such beam making an acute angle with the local vertical through the aircraft.

An "elliptical beam" is a beam, having an elliptical cross-section, of electromagnetic energy at a single frequency, directed downwardly and away from the line of flight of an aircraft, the longitudinal axis of such beam making an acute angle with the local vertical through the aircraft. The intersection of such a beam on the terrain is an ellipse encompassing several isodops, the major axis of such ellipse making an acute angle with the projection of the longitudinal axis of the beam on the terrain.

"Terrain bias shift" is the shift in the centroid of the spectrum of frequencies reflected back from the illuminated area on the terrain when the reflective character of the terrain changes. Such a shift in turn causes an apparent change in the depression angle of the beam which is reflected as an apparent change in the velocity of the aircraft.

Referring now to FIG. 1, the line labelled A–X represents the ground track of an aircraft and the broken line A–B represents the projection, in a horizontal plane, of the longitudinal axis of a pencil beam (unnumbered) at an angle $\alpha$ from the line A–X. The ellipse 10 represents the intersection of the pencil beam on the terrain beneath an aircraft (not shown). The major axis of the ellipse 10 is collinear with the line A–B. The lines 12, 14, 16 represents isodops. If it be assumed that the power in the transmitted beam is symmetrically distributed with respect to the longitudinal axis thereof and that the reflective characteristics of the terrain are such that each unit area within the ellipse 10 contributes equally to the energy reflected back to an antenna at point A, then, obviously, the centroid of the spectrum of frequencies of the reflected signals corresponds with the frequency of the signal reflected from the centroid of the ellipse 10. In a practical case, it is known that this situation exists when the area within the ellipse 10 is "rough," as when the aircraft is over land. If, on the other hand, each unit area within the ellipse 10 does not contribute equally to the signal reflected back toward point A and the lines are not parallel the longitudinal axis of the beam, then the centroid of the spectrum of frequencies of the reflected signals moves from the centroid of the ellipse 10. This situation exists when the aircraft is over a "smooth" surface, as water. In such a situation, comparatively less energy is backscattered from the shaded portion of the ellipse 10 than from the unshaded portion thereof. This means that the centroid of the spectrum of frequencies of the energy reflected back to the aircraft shifts toward the aircraft. In other words, the terrain bias shift is, in this situation, such that the Doppler frequency decreases.

Referring now to FIG. 2, the line labelled A–X again represents the ground track of an aircraft, the lines 12, 14 and 16 are isodops and the line AB represent the projected longitudinal axis of a fan beam of great eccentricity, say 100:1, In this case, the intersection of the fan beam on the terrain is an ellipse 10′. When a rough surface is illuminated, the centroid of the spectrum of frequencies reflected back again corresponds to the centroid of the ellipse 10′. When a smooth surface is illuminated, the orientation of the ellipse 10′ with respect to the projected longitudinal axis of the elliptical beam determines whether or not, and in what direction, the centroid of the spectrum of reflected frequencies shifts. For example, when the ellipse 10′ is aligned with the isodop 14, or when it is perpendicular to the line A–B, then no substantial shift in the centroid of the spectrum of the reflected signals is experienced. In the illustrated case, however, it may be seen that comparatively less energy is backscattered from the shaded portion of the ellipse 10′ than from the unshaded portion thereof. This means, then, that the higher frequency components in the spectrum of signals reflected back to the aircraft are favored and, consequently, the centroid of such spectrum shifts to a higher frequency. When the ellipse 10′ is perpendicular to the illustrated position, an equal and opposite effect is experienced and the shift in the centroid of the spectrum of the signals reflected back to the aircraft shifts downwardly.

A moment's thought will make it clear that, if no restrictions are placed on the dimensions of the antenna which forms the fan beam of FIG. 2, a satisfactory solution to the problem of terrain bias may be attained by orienting such a beam either along an isodop or perpendicular to the longitudinal axis of such beam. In a practical case, however, restrictions on the dimensions of an antenna are such that, at best, only an approximation of a fan beam is possible. This, in turn, means that compansation for terrain bias may only be partial.

It will be noted, however, that the maximum positive shift (that is, toward a higher frequency) of the centroid of the spectrum of the frequencies reflected back to the aircraft from within the ellipse 10′ occurs when the ellipse 10′ is oriented as shown. That is, the maximum positive shift occurs when the ellipse 10′ is oriented so as to bisect the smaller angle between the isodop 14 and the perpendicular to the projection of the longitudinal axis of the beam forming the ellipse 10′. This suggests that there is a beam shape which will combine the characteristics of both the pencil beam of FIG. 1 and the fan beam of FIG. 2 in such a manner that terrain bias will have no effect on the centroid of the spectrum of frequencies reflected back to an aircraft. As a matter of fact, I have found that a properly shaped and oriented elliptical beam will so combine the characteristics of a pencil and a fan beam. Such a beam, of course, known to be formed by an antenna whose aperture is in the form of a parallelogram.

In FIG. 3 the major axis 17 of ellipse 10″ is aligned with the bisector of the smaller angle between the isodop 14 and the perpendicular to the horizontal projection of the longitudinal axis of the beam. The minor axis 18 of the ellipse 10″ is, of course, perpendicular to the major axis 17 thereof. The ends of the minor axis are determined by the intersections of a circle of a diameter equal to the major axis of the horizontal projection on the terrain of a conical beam of the desired size as shown by the dotted circle 19, with the minor axis 18. The ends of the major axis 17 are found by dropping lines (unnumbered) from the ends of the minor axis 18 perpendicular to the horizontal projection of the longitudinal axis of the beam and extending such lines to intersect the major axis 17.

The independence of a beam shaped and oriented as in FIG. 3 from the effect of terrain bias may be shown by considering the ellipse 10″ to be made up of elemental strips parallel to the line $\overline{FD}$. Each such elemental strip defines an illuminated area at a different depression angle, $\beta$, and the centroid of the individual strips are each located on the isodop 14. Hence, the overall centroid must also be on that same isodop 14, regardless of the strength of the contributions from the individual strips. It follows then, that, if terrain bias has no effect on any of the elemental strips, terrain bias has no effect on returns from the ellipse 10″.

It is apparent that, in any given case, it is necessary to know the azimuth angle, $\alpha$, the depression angle $\beta$, (meaning the vertical angle between the longitudinal axis of the beam) and the inclination, $m$ of the isodop 14 at the illuminated area, if the orientation of the ellipse 10″ with respect to the ground track A–X is to be determined. For example, if the azimuth angle, $\alpha$, is 45°, the depression angle $\beta$, is 70° then the inclination, $m$, of the isodop 14 at the center of the ellipse 10″ may be calculated to be 3°33′. Further, if it is assumed that the isodops 12, 14, 16 are, within the ellipse 10″, linear, an insignificant error is introduced. With the foregoing assumptions it will be found that the optimum eccentricity of the ellipse 10″ is 2.2:1. The actual eccentricity of the beam forming the ellipse 10″ (assuming that the beam is 5° wide) is then 2.4:1. It should be noted here that the elliptical beams of greater eccentricity than that of the beam illustrated in FIG. 3 may be developed to attain the desired independence of the centroid of the reflected signals from the character of the terrain. Such beams must, however, be oriented so that their major axes lie between the lines $\overline{DE}$ and $\overline{DF}$ of FIG. 3. It should also be noted that, if an elliptical beam having less eccentricity than the ellipse 10″ of FIG. 3 is used, only a partial compensation for the character of the terrain is possible. It should also be noted that it is not essential to the invention that the beam be elliptical. Obviously other shapes may be developed from elemental strips which are each parallel to a line of constant depression angle and are centered on an isodop.

Referring now to FIGS. 4 and 5 together, it may be seen that a system according to the invention comprises an antenna 20 disposed so as to transmit three elliptical beams 21, 22, 23 downwardly from an aircraft 24 in the so-called "lambda" configuration. The shape and the orientation of each beam is determined in accordance with the principles set forth hereinbefore so that the returns on each beam are independent of the reflective characteristics of the terrain illuminated by each. The antenna 20 is connected to a conventional transmitter/receiver unit 25, frequency tracker 26 and display device 27, as for example those of the AN/APN–131. Thus, indication of altitude ground speed, drift and/or position are derived.

It should be noted that, for best results, it is desirable that the antenna 20 be stabilized at least to a degree that the angle $\alpha$ remain constant. The antenna shown in FIGS. 6 and 7 is satisfactory for such a purpose and, at the same time, provides the desired elliptical beams 21, 22, 23 of FIGS. 4 and 5.

Referring now to FIG. 6 it may be seen that the antenna 20 is mounted in gimbals 30, 31 so that it remains level when the aircraft pitches or rolls. The gimbal 30 is, of course, attached in any desired way to the aircraft, The antenna 20 is affixed in any desired way to a shaft 32 which is rotatably mounted on the gimbal 31. A gear 33 is affixed to the shaft 32. A motor 34, with appropriate gearing to mesh with the gear 33, is mounted on the gimbal 31. The motor 34 is energized by conventional means (not shown) in response to the difference signal between beams 22 and 23 until a null occurs. Under such a condition, the beams are properly aligned with the ground track of the aircraft. That is, the angle $\alpha$ is maintained constant.

Referring now to FIG. 7 the beam forming portion of the antenna 20 may be seen to be two planar arrays 40, 42 each consisting of a plurality of radiating members, as the members 43. The radiating slots in each of the planar arrays 40, 42 are disposed so that array 40 produces the left forward and right rear beams shown in FIG. 4 and array 42 produces the left rear beam shown in that figure.

Having described a working embodiment of the invention, it is now obvious that many changes may be made without departing from my inventive concepts. For example, the antenna need not be two planar arrays, it being evident that other antenna configurations, as a properly shaped dielectric lens, horn-fed antenna could be used. Further, the invention could be incorporated in any Doppler system it also being evident that the advantages of the invention would improve Doppler systems other than the AN/APN-131. It is felt, therefore, that the invention should not be restricted to its illustrated embodiment but rather should be limited only by the spirit and scope of the appended claims.

I claim:

1. An airborne Doppler radar system wherein the centroid of the spectrum of frequencies reflected back remains constant regardless of changes in the reflective characteristics of the terrain beneath an aircraft, comprising:

(a) means for propagating an elliptical beam of electromagnetic energy downwardly from the aircraft to illuminate an area on the terrtain, such area:
   (1) lying between the ground track of the aircraft and a first line perpendicular thereto;
   (2) being symmetric about a second line lying between a third line perpendicular to the horizontal projection of the longitudinal axis of the beam and a fourth line passing through the center of such area and defining points from which returns of a single frequency are reflected; and,
   (3) having a length to width ratio, where the length is measured along the second line and the width is measured along a fifth line perpendicular to the second line, between the limits of 2:1 and 10:1; and, (b) means for processing the electromagnetic energy reflected back to the aircraft from such area to derive a signal indicative of the ground speed of the aircraft.

2. An airborne Doppler radar system utilizing a plurality of beams of electromagnetic energy, each one of the plurality of beams being directed downwardly from an aircraft to provide Doppler shift signals indicative of the ground speed of the aircraft and the velocity of the aircraft along coordinates orthogonal to such ground track, comprising:

(a) means for shaping each one of the plurality of beams into an elliptical beam;
(b) means for orienting each one of the plurality of beams with respect to the ground track of the aircraft to minimize changes in the Doppler shift signals resulting from changes in the reflective characteristics of the terrain illuminated by each one of the plurality of beams; and,
(c) means for processing the spectrum of frequencies reflected back in each one of the plurality of beams to derive signals indicative of the velocity of the aircraft along the selected coordinates.

3. The method of deriving a Doppler shift signal in an airborne Doppler radar system comprising the steps of:

(a) generating microwave energy at a single frequency;
(b) propagating such energy in an elliptical beam downwardly to illuminate an area on the terrain beneath an aircraft, such area being symmetric about a line lying between an isodop and a line of equi-altitude so that the centroid of the spectrum of frequencies reflected from such area back to the aircraft remains constant with changes in the reflective characteristics of such area; and
(c) comparing such centroid with the frequency of the transmitted energy to derive a signal indicative of the velocity of the aircraft.

4. The method of deriving a Doppler shift signal as in claim 3, except having the additional steps of:

(a) orienting the major axis of the beam midway between an isodop and a line of equi-altitude.

References Cited by the Examiner

UNITED STATES PATENTS 2,911,644 11/1959 Stavis ------------ 343—758

CHESTER L. JUSTUS, *Primary Examiner.*

R. D. BENNETT, *Assistant Examiner.*